(12) United States Patent
Racine

(10) Patent No.: US 7,185,606 B1
(45) Date of Patent: Mar. 6, 2007

(54) BIRD FEEDING ASSEMBLY

(76) Inventor: Paul P. Racine, 35 Dover St., Providence, RI (US) 02908

( * ) Notice: Subject to any disclaimer, the term of this patent is extended or adjusted under 35 U.S.C. 154(b) by 0 days.

(21) Appl. No.: 11/140,043

(22) Filed: May 31, 2005

(51) Int. Cl.
*A01K 61/02* (2006.01)
(52) U.S. Cl. .................... 119/57.8; 119/57.9; 119/52.2; 119/52.3
(58) Field of Classification Search ............... 119/57.8, 119/57.9, 52.2, 52.3, 72, 68
See application file for complete search history.

(56) References Cited

U.S. PATENT DOCUMENTS

| | | | |
|---|---|---|---|
| 3,301,217 A | 1/1967 | Prowinsky | |
| 3,367,632 A | 2/1968 | Vail | |
| 3,792,685 A | 2/1974 | Wiener | |
| 3,986,480 A | 10/1976 | Vail | |
| 4,702,198 A | 10/1987 | Holyoak | |
| D341,911 S | 11/1993 | Thomson | |
| 5,339,767 A * | 8/1994 | Krag | 119/57.8 |
| 5,560,314 A | 10/1996 | Wessinger | |
| 6,647,920 B2 * | 11/2003 | Lovett | 119/52.2 |

* cited by examiner

*Primary Examiner*—Peter M. Poon
*Assistant Examiner*—Willie Berry, Jr.

(57) ABSTRACT

A bird feeding assembly includes a tubular member that has a top end and a bottom end. A rod extends through the tubular member. The rod has a pair of outer ends extending in opposite directions with respect to the rod. A pair of loops is attached to the rod. A first cord has a first end positioned within the tubular member and a second end attached to and extending downwardly from the rod. A second cord has a first end positioned within the tubular member and a second end attached to and extending downwardly from the rod. Each of a pair of bird feeders is attached to one of the second ends of the first and second cords. A pulley apparatus is coupled to each of the cords and is adapted for selectively lifting or lowering the bird feeders with respect to the rod.

4 Claims, 3 Drawing Sheets

BIRD FEEDING ASSEMBLY

BACKGROUND OF THE INVENTION

1. Field of the Invention

The present invention relates to bird feeding devices and more particularly pertains to a new bird feeding device for holding a pair of bird feeders in such a manner that each of the birdfeeders is protected from squirrels.

2. Description of the Prior Art

The use of bird feeding devices is known in the prior art. U.S. Pat. No. 5,560,314 describes a device that allows a person to lower and lift a plurality of bird feeding gourds. Another type of bird feeding device is U.S. Pat. No. 3,367,632 having a birdhouse that may be selectively lowered and lifted along a post. Yet another such device, again including a birdhouse that is selectively moved upwardly and downwardly along a post is found in U.S. Pat. No. 3,986,480. Still yet another such device is found in U.S. Pat. No. 4,702,198.

While these devices fulfill their respective, particular objectives and requirements, the need remains for a device that allows a person to hang a pair of bird feeders in such a manner that they may be selectively raised and lowered. Additionally, the bird feeders should be spaced from a post that vertically supports the bird feeders to aid in the prevention of squirrel accessing the bird feeders.

SUMMARY OF THE INVENTION

The present invention meets the needs presented above by comprising a tubular member that has a top end and a bottom end. The bottom end is pointed. A rod extends through and is orientated perpendicular to the tubular member. The rod is positioned adjacent to the top end. The rod has a pair of outer ends extending in opposite directions with respect to the rod. A pair of loops is attached to the rod. A first cord has a first end positioned within the tubular member and a second end attached to and extending downwardly from the rod. A second cord has a first end positioned within the tubular member and a second end attached to and extending downwardly from the rod. Each of a pair of bird feeders is attached to one of the second ends of the first and second cords. A pulley apparatus is coupled to each of the cords and is adapted for selectively lifting or lowering the bird feeders with respect to the rod. The bottom end of the tubular member is extended into a ground surface.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
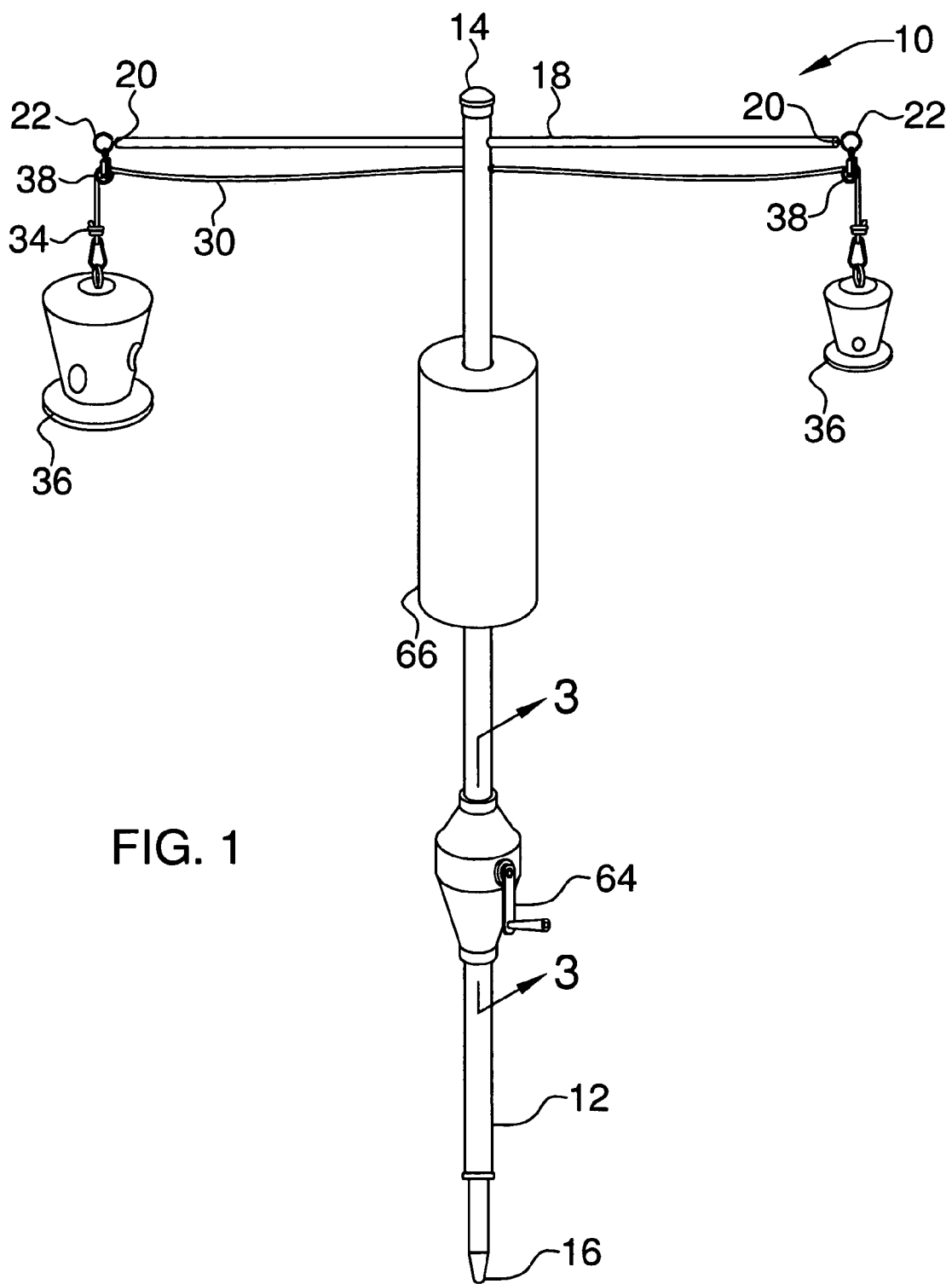
FIG. 1 is a front perspective view of a bird feeding assembly according to the present invention.
Figure 2:
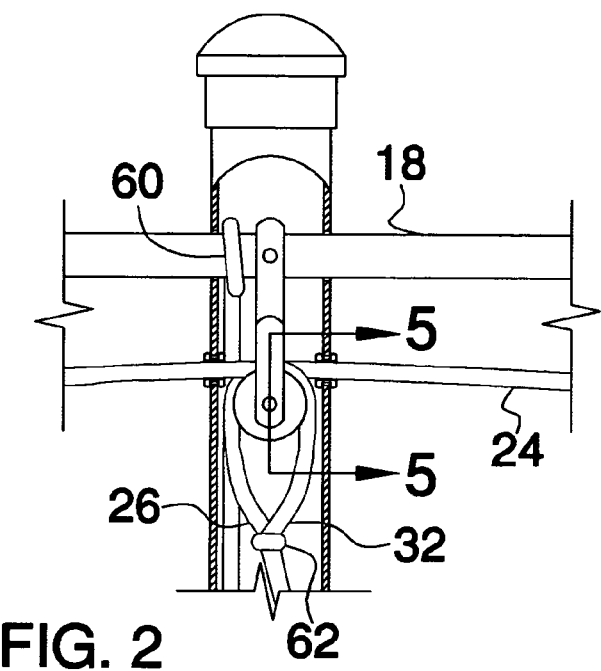
FIG. 2 is a cross-sectional view of a tubular member of the present invention.
Figure 4:
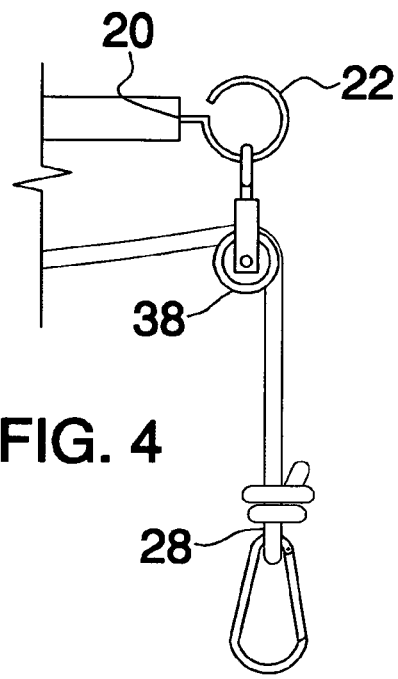
FIG. 4 is an enlarged view of an outer end of a rod of the present invention.
Figure 3:
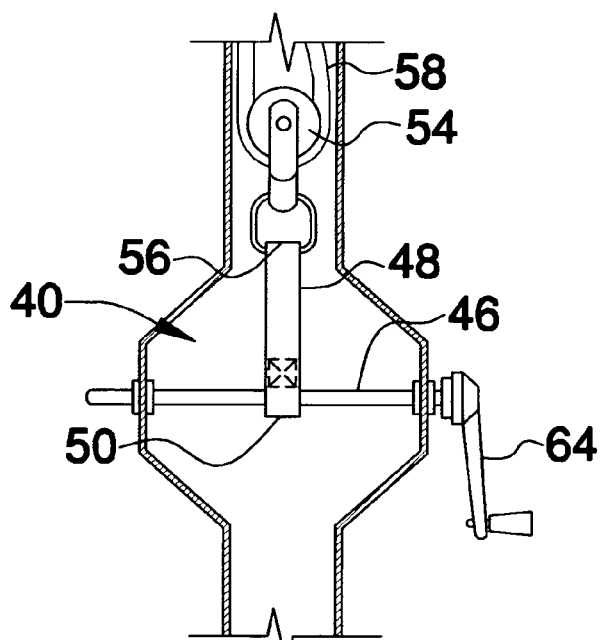
FIG. 3 is a cross-sectional view taken along line 3—3 of FIG. 1 of the present invention.
Figure 5:
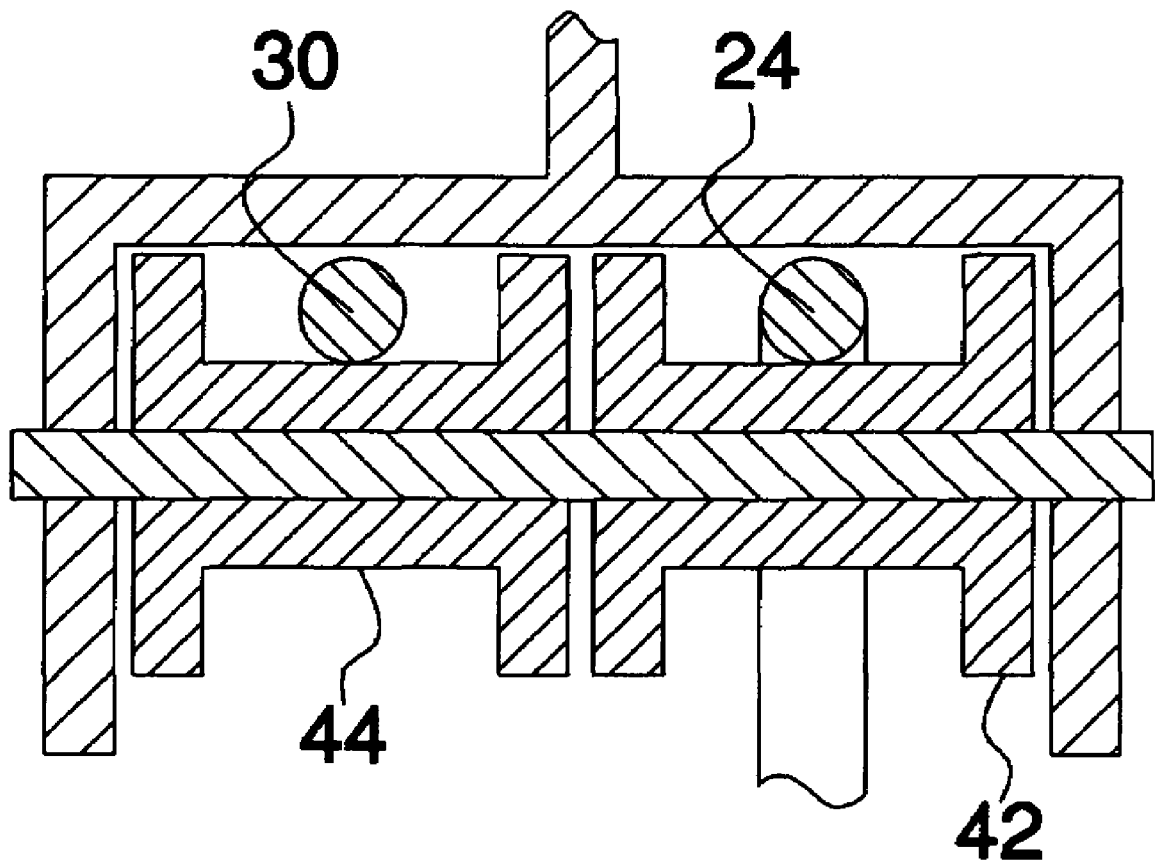
FIG. 5 is a cross-sectional view taken along line 5—5 of FIG. 2 of the present invention.

With reference now to the drawings, and in particular to FIGS. 1 through 5 thereof, a new bird feeding device embodying the principles and concepts of the present invention and generally designated by the reference numeral 10 will be described.

As best illustrated in FIGS. 1 through 5, the bird feeding assembly 10 generally comprises a tubular member 12 that has a top end 14 and a bottom end 16. The bottom end 16 is pointed. A rod 18 extends through and is orientated perpendicular to the tubular member 12. The rod 18 is positioned adjacent to the top end 14 and has a pair of outer ends 20 extending in opposite directions with respect to the rod 18. A pair of loops 22 is attached to the rod 18. Each of the loops 22 is attached to one of the outer ends 20. The tubular member 12 has a height generally between 10 feet and 14 feet.

A first cord 24 has a first end 26 positioned within the tubular member 12 and a second end 28 attached to and extending downwardly from the rod 18. A second cord 30 has a first end 32 positioned within the tubular member 12 and a second end 34 attached to and extending downwardly from the rod 18. A pair of bird feeders 36 is provided. Each of the bird feeders 36 is attached to one of the second ends 28, 34 of the first 24 and second 30 cords.

A pair of outer pulleys 38 is provided. Each of the outer pulleys 38 is attached to one of the loops 22 and each of the first 24 and second 30 cords extends around one of the outer pulleys 38.

A pulley apparatus 40 is coupled to each of the cords 24, 30 and is adapted for selectively lifting or lowering the bird feeders 36 with respect to the rod 18. The pulley apparatus 40 includes a first pulley 42 and a second pulley 44 each rotatably mounted in the tubular member 12. The first 42 and second 44 pulleys are fixedly coupled to and each is positioned adjacent to the rod 18. An axle 46 extends through and is rotatably coupled to the tubular member 12. The axle 46 is positioned between the top end 14 and the bottom end 16. A first tether 48 is positioned in the tubular member 12 and has a first end 50 attached to the axle 46. A third pulley 54 is positioned in the tubular member 12 and is attached to a second end 56 of the first tether 48. A second tether 58 positioned within the tubular member 12 and is extended around the third pulley 54. The second tether 58 has a first end 60 attached to the rod 18. The first 24 and second 30 cords each extend around one of the first 42 and second 44 pulleys. A second end 62 of the second tether 58 is attached to each of the first ends 26, 32 of the first 24 and second 30 cords, respective. A handle 64 is attached to the axle 46 and is positioned outside of the tubular member 12. The pulley apparatus 40 may include a motorized actuator for pulling and retracting the axle 46 and would include any necessary controls required for operating the motorized actuator.

A housing 66 is attached to and extends around an outer surface of the tubular member 12. The housing 66 preferably has a cylindrical shape and aids in preventing squirrels from climbing up the tubular member 12.

In use, the bottom end 16 is removably extended into a ground surface so that the tubular member 12 is vertically orientated. The bird feeders 36 are lowered with the pulley apparatus and filled with bird feed. The bird feeders 36 are then lifted back up to a position adjacent to the rod 18 with the pulley apparatus 40. Alternate embodiments may also include a single feeder 36 supported from a single arm extending outwardly form the tubular member 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable bird feeding assembly comprising:
   a tubular member having a top end and a bottom end, said bottom end being pointed;
   a rod extending through and being orientated perpendicular to said tubular member, said rod being positioned adjacent to said top end, said rod having a pair of outer ends extending in opposite directions with respect to said rod, a pair of loops being attached to said rod;
   a first cord having a first end positioned within said tubular member and a second end attached to and extending downwardly from said rod;
   a second cord having a first end positioned within said tubular member and a second end attached to and extending downwardly from said rod;
   a pair of bird feeders, each of said bird feeders being attached to one of said second ends of said first and second cords;
   a pulley apparatus being coupled to each of said cords and being adapted for selectively lifting or lowering said bird feeders with respect to said rod, said pulley apparatus including;
      a first pulley and a second pulley each being rotatably mounted in said tubular member, said first and second pulleys each being positioned adjacent to said rod;
      an axle extending through and being rotatable coupled to said tubular member, said axle being positioned between said top end and said bottom end, a first tether being positioned in said tubular member, said first tether having a first end being attached to said axle, a third pulley being positioned in said tubular member and being attached to a second end of said first tether, a second tether positioned within said tubular member and being extended around said third pulley, said second tether having a first end attached to said rod, said first and second cords each extending around one of said first and second pulleys, a second end of said second tether being attached to each of said first ends of said first and second cords; and
      a handle being attached to said axle and being positioned outside of said tubular member; and
   wherein said bottom end may be removably extended into a ground surface.

2. The assembly according to claim 1, further including a pair of loops being attached to said rod, each of said loops being attached to one of said outer ends, a pair of outer pulleys, each of said outer pulleys being attached to one of said loops, each of said first and second cords extending around one of said outer pulleys.

3. The assembly according to claim 1, further including a housing being attached to and extending around an outer surface of said tubular member.

4. An adjustable bird feeding assembly comprising:
   a tubular member having a top end and a bottom end, said bottom end being pointed;
   a rod extending through and being orientated perpendicular to said tubular member, said rod being positioned adjacent to said top end, said rod having a pair of outer ends extending in opposite directions with respect to said rod, a pair of loops being attached to said rod, each of said loops being attached to one of said outer ends;
   a first cord having a first end positioned within said tubular member and a second end attached to and extending downwardly from said rod;
   a second cord having a first end positioned within said tubular member and a second end attached to and extending downwardly from said rod;
   a pair of bird feeders, each of said bird feeders being attached to one of said second ends of said first and second cords;
   a pair of outer pulleys, each of said outer pulleys being attached to one of said loops, each of said first and second cords extending around one of said outer pulleys;
   a pulley apparatus being coupled to each of said cords and being adapted for selectively lifting or lowering said bird feeders with respect to said rod, said pulley apparatus including;
      a first pulley and a second pulley each being rotatably mounted in said tubular member, said first and second pulleys each being positioned adjacent to said rod;
      an axle extending through and being rotatably coupled to said tubular member, said axle being positioned between said top end and said bottom end, a first tether being positioned in said tubular member, said first tether having a first end being attached to said axle, a third pulley being positioned in said tubular member and being attached to a second end of said first tether, a second tether positioned within said tubular member and being extended around said third pulley, said second tether having a first end attached to said rod, said first and second cords each extending around one of said first and second pulleys, a second end of said second tether being attached to each of said first ends of said first and second cords;
      a handle being attached to said axle and being positioned outside of said tubular member;
   a housing being attached to and extending around an outer surface of said tubular member; and
   wherein said bottom end may be removably extended into a ground surface.

* * * * *